Dec. 11, 1945.  R. W. CARLISLE  2,390,825
EYEGLASSES
Filed Nov. 16, 1942  2 Sheets-Sheet 1

INVENTOR
RICHARD W. CARLISLE
BY
AGENT

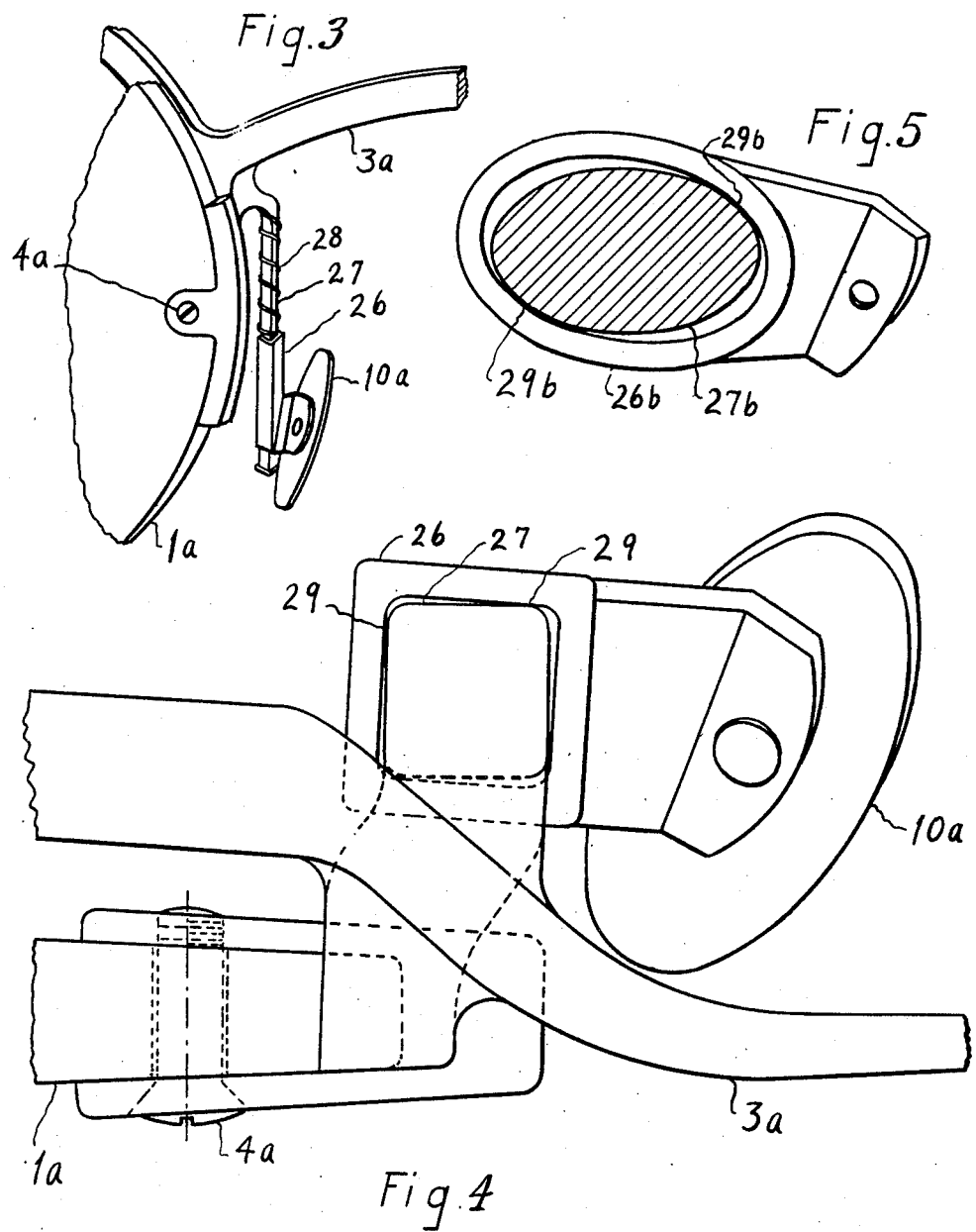

Patented Dec. 11, 1945

2,390,825

UNITED STATES PATENT OFFICE 2,390,825

EYEGLASSES

Richard Wallace Carlisle, Greenburgh, N. Y.

Application November 16, 1942, Serial No. 465,648

5 Claims. (Cl. 88—43)

This invention relates to eyeglasses, and more particularly to eyeglasses adapted to hold lenses of the bifocal type.

Bifocal type lenses are commonly used by persons whose eyes require different correction for different distances of focus, and normally the bottom parts of the lenses are made to the prescription necessary for close work, while the upper parts of the lenses are made to the prescription necessary for more distant vision. The necessity of moving the eye up or down in order to use that portion of the lens best suited for the distance of the object which it is desired to see has resulted in certain difficulties which have caused many users of bifocal lenses eye strain, discomfort, and even accident. These difficulties have particularly attended reading newspapers, large drawings, walking up or down steps, and, in general, doing things which normally require a wider range of eye movement than is permitted by the height of the particular part of the lens being used. In going down steps, for example, it is usually desirable to look through the upper part of the lenses, but it then becomes necessary to hold the head down so far in order to avoid the nearest steps from being viewed through the lower part of the lenses as to cause discomfort, and often a top step may appear more distant than it actually is, due to the break between the two parts of the lenses. In reading, the range of vision is drastically limited and, furthermore, the eyes must be strained and held in a position which is both unnatural and uncomfortable over a considerable period of time in order to utilize the lower portion of the bifocal lenses.

It is one object of my invention to permit an adjustment of the position of the lenses and their frames so that the desired lens is most comfortably used.

It is another object of my invention to position the lenses so that the optical break between the different parts of the bifocal lenses will be out of the useful field of vision of the wearer.

It is still another object of my invention to provide means whereby eyeglasses either for distant or near vision may be easily removed from the field of vision when not required.

It is still another object of my invention to provide a resilient or compliant motion between the nosepieces and the frames of bifocal glasses which permits relative movement of the frames with respect to the nosepieces.

Compliance is defined for the purposes of this invention as the ratio of a spring deformation, in inches, to the ratio of force, in ounces, required to cause said deformation. The force resulting from the pressure of a spring on a nosepad will accordingly be increased as the spring is compressed in inverse proportion to the compliance of the spring.

It is another object of my invention to provide a simple normal adjustment between the frames and nosepieces.

Other objects of my invention will be apparent from the following specification and the attached drawings which are intended to show several forms of the invention, but which it is to be understood are not limiting thereof. In the drawings, Figure 1 is a front elevation of a pair of bifocal glasses made in accordance with my invention in position on the face of a wearer and showing the range of adjustment;

Figure 3 is a view in elevation, partially broken away, of a modified form of my invention;

Figure 4 is an enlarged plan view of part of the frame of Fig. 3;

Figure 5 is a view partly in cross-section of an alternative form of the structure of Fig. 4;

Figure 1:
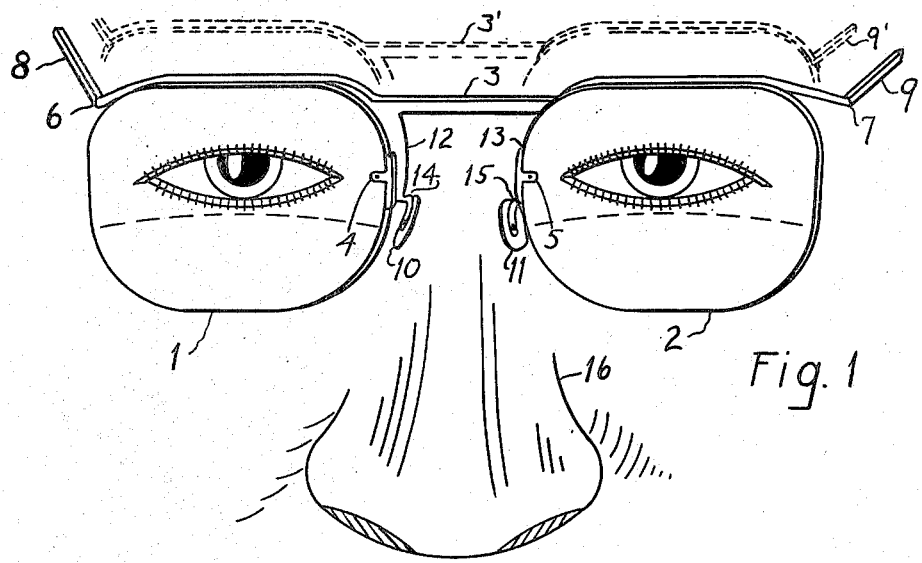

Referring first to Figure 1 of the drawings, there is shown eyeglasses having a pair of lenses 1, 2 retained in the frame 3 by screws, pins, or other holding devices 4, 5 in manner well known in the art. At the ends of the frames 6, 7 are hinged the ear pieces 8, 9 which fit over the wearer's ears to hold up the frames and prevent rotational movement thereof. Nosepieces 10, 11 are connected to the extensions 12, 13 of the frame 3 by the connecting members 14, 15 in such manner that the weight of the glasses and frames rests on the nose 16 of the wearer through the members 14, 15 and the nosepieces 10, 11. The dotted lines of Figure 1 show the eyeglasses moved in accordance with my invention to a second position such that the normal position of the eye will allow free use of the lower portion of the bifocal lenses.

Figure 2:
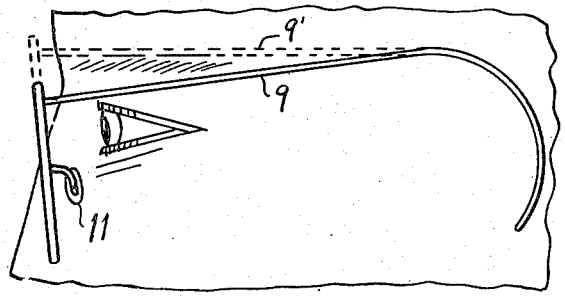
Figure 2 is a side elevation of the assembly of Fig. 1, showing the range of adjustment.

In Figure 2, as in Figure 1, the dotted position of the glasses shows the raised or upper position of the lenses by which the lower part of the bifocal comes into the path of normal vision. In the lower position the eyes normally look through the upper portions of the lenses, which are specifically prescribed for distant vision, whereas in the upper or dotted position the eyes normally look through the lower portions of the lenses, which are designed for close vision. With bifocals of the type heretofore in common use, the lower portion of the lenses, i. e. the portion used for close work, has necessarily been made small both in order to permit the wearer to move about safely and to give a wide range of vision while using the upper or distant part of the lenses. The adjustable feature of the present invention permits making the lower portion of the lenses large and thus gives a large field of vision for close work such as reading. This is particularly desirable in reading, where it now becomes possible to scan over a page by naturally moving the eyes whereas formerly with the old type of bifocals it would have been necessary for the reader to have moved his head back and forth and from side to side to cover an entire page. It is found therefore, that while wearing glasses made in accordance with the present invention, there occurs a great reduction in the fatigue incident to reading.

Referring now to Figures 3–5, there is shown another embodiment of my invention in which I have used a slider member 26 sliding on a frame extension 27 and with a spring member 28 optionally used to help support the weight of the glasses between the frame and the slider member 26. Member 27 being rectangular in shape, prevents rotation of the slide member 26 and thereby locates the nosepiece 10a in its proper relation to the nose of the wearer. Once adjusted and placed on the nose, the pressure between the members 26, 27 tends to jam the corners of the slider 26 against the member 27 and prevents any sliding motion between the two parts. However, if it is desired to adjust the frames upward or downward, it is necessary only to relieve the torsion between the members 26, 27 by pulling forward slightly on the glasses and then to slide the frames up or down. The springs 28, if used, should be just strong enough to overcome the friction of the slide and push the nosepiece member down onto the nose when the torsion is released and the glasses lifted.

Figure 4 shows how the corners 29 of the member 27 make line contact with the slide 26 and prevent further motion of the slide when there is torsional pressure due to the nosepieces 10a bearing against the nose of the wearer.

Figure 5 shows a modified form of the structure of Figures 3 and 4 in which, instead of using a square member 27 and a square slide 26, the member 27b is made elliptical, which can prevent rotational movement and the slide 26b is made to fit around the member 27b. In this form the contact occurs along the lines 29b and will again prevent relative sliding of the two parts while under torsion. This form of the invention has the further advantage that the nosepieces 10a retain the same position on the nose of the wearer as adjustment is made. In cases of lack of nose symmetry this may become an essential consideration.

While a number of forms of my invention have been shown in the accompanying drawings and described in the foregoing specification, it is to be understood that these are merely illustrative of my invention and are shown here in order better to enable anyone skilled in the art to follow the teachings thereof. Many changes and additions may be made without departing from the spirit and scope thereof.

In the following claims, "vertical" and "horizontal," when used to describe the position of the eyeglasses, in every case assume the wearer's head is being held in a normal upright position.

What I claim is:

1. A bifocal eyeglass assembly comprising in combination bifocal lenses having large lower segments, a frame having a single inconspicuously disposed bridge member, bows adapted to fit over the ears of the wearer and hold the lenses substantially equidistant from the eyes with the centers along a horizontal line, two elongated members having non-circular cross section forming portions of said frame and disposed substantially vertically along the inner edges of said lenses, two hollow members, the openings through which are of non-circular cross section conforming loosely to said elongated members and arranged to slide freely thereon when not under torque, arms extending substantially radially from said hollow members, said arms being adjustable to any position within the range of length of said elongated members by sliding the hollow members on the elongated members, and nose pieces connected to said arms, said nose pieces causing said hollow members to twist and thereby lock frictionally on said elongated members when said nose pieces are pressed on the nose.

2. A bifocal eyeglass assembly comprising in combination bifocal lenses, a frame having a bridge member, bows adapted to fit over the ears of the wearer and hold the lenses substantially horizontal and equidistant from the eyes; elongated supporting means for said frame disposed substantially vertically along the inner edge of said lenses and having non-circular cross section, elongated hollow means having a non-circular hole which conforms loosely to the cross section of said elongated supporting means and arranged to slide freely thereon when not under torque, arms extending substantially radially from one of said means, and nosepieces attached to the ends of said arms, the other of said means forming a portion of the frame, said nosepieces and arms being arranged to cause the means to which they are attached to twist and thereby frictionally interlock when the nosepieces are pressed onto the nose.

3. A bifocal eyeglass assembly as described in claim 2 which further comprises means for preventing the means to which the arms and nosepieces are attached from sliding off the means which comprise a portion of the frame.

4. A bifocal eyeglass assembly as described in claim 2, in which the elongated supporting means has a substantially oval cross section.

5. A bifocal eyeglass assembly as described in claim 2 which further includes spring members juxtaposed to and acting upon both the elongated supporting means and the hollow means, said spring members having a compliance such as to help overcome the sliding friction between said means when the lenses are elevated by the wearer, but said spring members not being sufficiently strong to raise the frame without manual assistance.

RICHARD WALLACE CARLISLE.